US012474111B2

(12) United States Patent
Lee et al.

(10) Patent No.: US 12,474,111 B2
(45) **Date of Patent: *Nov. 18, 2025**

(54) REFRIGERATOR

(71) Applicant: LG ELECTRONICS INC., Seoul (KR)

(72) Inventors: Sanggyun Lee, Seoul (KR); Younseok Lee, Seoul (KR); Yongwon Dong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 171 days.

This patent is subject to a terminal disclaimer.

(21) Appl. No.: 18/020,057

(22) PCT Filed: Jul. 23, 2021

(86) PCT No.: PCT/KR2021/009561

§ 371 (c)(1),
(2) Date: Feb. 6, 2023

(87) PCT Pub. No.: WO2022/030835

PCT Pub. Date: Feb. 10, 2022

(65) Prior Publication Data

US 2023/0304726 A1 Sep. 28, 2023

(30) Foreign Application Priority Data

Aug. 7, 2020 (KR) ........................ 10-2020-0099096

(51) Int. Cl.

| | |
|---|---|
| ***F25D 23/02*** | (2006.01) |
| ***E05F 1/12*** | (2006.01) |
| ***E05F 3/20*** | (2006.01) |

(52) U.S. Cl.
CPC .......... *F25D 23/028* (2013.01); *E05F 1/1207* (2013.01); *E05F 3/20* (2013.01);
(Continued)

(58) Field of Classification Search
CPC ............. F25D 23/028; F25D 2323/021; F25D 2323/024; F16C 11/04; E05F 1/1207;
(Continued)

(56) References Cited

U.S. PATENT DOCUMENTS 5,138,743 A * 8/1992 Hoffman ............... E05F 1/1223 16/303
5,220,747 A * 6/1993 Cherry .................. F24C 15/023 49/386
(Continued)

FOREIGN PATENT DOCUMENTS

CN 1699902 A 11/2005
CN 101611279 A 12/2009
(Continued)

*Primary Examiner* — James O Hansen
(74) *Attorney, Agent, or Firm* — Bryan Cave Leighton Paisner LLP

(57) ABSTRACT

A refrigerator includes: a cabinet having a storage space; a hinge bracket coupled to the cabinet; a door which is rotatably coupled to a shaft provided at the hinge bracket, and which open/close the storage space; and an automatic closing device which is provided at the door at a position spaced from the rotational center line of the door, and which operates together with the hinge bracket during closing of the door, so that the door automatically closes, where the automatic closing device includes: a lever that rotates around a rotational center line spaced from the rotational center line of the door; an elastic member connected to the lever; and a body which is provided at the door and which rotatably supports the lever.

20 Claims, 17 Drawing Sheets

(52) U.S. Cl.
CPC ....... *E05Y 2201/21* (2013.01); *E05Y 2201/41* (2013.01); *E05Y 2900/31* (2013.01); *F25D 2323/021* (2013.01); *F25D 2323/024* (2013.01)

(58) Field of Classification Search
CPC .... E05F 3/20; E05Y 2201/21; E05Y 2201/41; E05Y 2900/31
See application file for complete search history.

(56) References Cited

U.S. PATENT DOCUMENTS

| | | | | |
|---|---|---|---|---|
| 5,522,656 | A | 6/1996 | Jenkins | |
| 6,910,665 | B2 * | 6/2005 | Avendano | F25D 23/00 16/284 |
| 2005/0273974 | A1 * | 12/2005 | Han | E05D 11/02 16/50 |
| 2006/0232176 | A1 * | 10/2006 | Kim | E05D 3/12 312/401 |
| 2008/0203739 | A1 | 8/2008 | Lim et al. | |
| 2009/0025178 | A1 | 1/2009 | Tamayama et al. | |
| 2017/0356685 | A1 * | 12/2017 | Jung | E05D 11/1014 |

FOREIGN PATENT DOCUMENTS

| | | | |
|---|---|---|---|
| CN | 102362040 | A | 2/2012 |
| CN | 103363755 | A | 10/2013 |
| CN | 105229398 | A | 1/2016 |
| CN | 105546911 | A | 5/2016 |
| CN | 106050039 | A | 10/2016 |
| CN | 106766595 | A | 5/2017 |
| CN | 109083511 | A | 12/2018 |
| CN | 109812151 | A | 5/2019 |
| CN | 110709657 | A | 1/2020 |
| CN | 110822795 | A | 2/2020 |
| CN | 110887320 | A | 3/2020 |
| DE | 102010017034 | A1 | 11/2010 |
| EP | 2023064 | A2 | 2/2009 |
| JP | 2001173306 | A | 6/2001 |
| JP | 2006078099 | A | 3/2006 |
| JP | 2008196749 | A | 8/2008 |
| JP | 2016105033 | A | 6/2016 |
| KR | 100819849 | B1 | 4/2008 |
| KR | 100874633 | B1 | 12/2008 |
| KR | 1020110043046 | A | 4/2011 |
| KR | 20150047976 | A | 5/2015 |
| KR | 101910655 | A | 10/2018 |
| KR | 101978452 | B1 | 5/2019 |
| KR | 102112574 | B1 | 5/2020 |

* cited by examiner

REFRIGERATOR

This application is the National Stage filing under 35 U.S.C. 371 of International Application No. PCT/KR2021/009561, filed Jul. 23, 2021, which claims priority to and the benefit of KR Patent Application No. 10-2020-0099096, filed Aug. 7, 2020, the disclosure of which is incorporated herein by reference in its entirety.

TECHNICAL FIELD

The present disclosure relates to a refrigerator.

BACKGROUND ART

In general, refrigerators are home appliances for storing foods at low temperature in an inner storage space covered by a refrigerator door. Here, the inside of the storage space is cooled using cool air that is generated by being heat-exchanged with a refrigerant circulated in a refrigeration cycle to store the foods in an optimal state.

The refrigerator may be independently placed in a kitchen or living room or may be accommodated in a space defined by a furniture cabinet of the kitchen.

As the refrigerator increases in size more and more, and multi-functions are provided to the refrigerator due to dietary life changes and pursues of high quality, refrigerators of various structures in consideration of user convenience are being brought to the market.

The refrigerator may include a cabinet defining a storage space and a door connected to the cabinet and having the storage space. A door storage portion for storing food may be provided in the door. When the door storage portion is provided, a lot of force is required for the user to close the door due to weight of the food stored in the door storage portion as well as a weight of the door itself.

In order for the user to easily close the door, recently, the refrigerator is provided with a hinge device for automatically closing the door when the door is closed at a certain angle.

An automatic return hinge device including a restoring device is disclosed in Korean Patent Registration No. 10-0874633.

In the document, the hinge device may include a body, a clutch device mounted inside the body, a shaft coupled to pass through the clutch device, and a first spring that transmits restoring force to the shaft when the door is closed.

The shaft serves to provide a rotational center of the door, and the first spring in the form of a coil spring is disposed in a direction parallel to the shaft.

In the case of the document, since the restoration device is disposed in a direction parallel to the rotational center of the door, a space for positioning the restoration device as high as the height of the restoration device is required in the door, and thus, there is a restriction in installing the restoration device.

In addition, the position of the rotational center of the door may vary according to a thickness of the door, and when the thickness of the door becomes thin, it may be impossible to install the restoration device in a direction parallel to the rotational center of the door.

SUMMARY

Embodiments provide a refrigerator provided with an auto closing device installed in a door regardless of a thickness of a door to provide closing force of the door.

Additionally or optionally, embodiments also provide a refrigerator in which a phenomenon, in which when a door is closed, the door opens again due to excessive closing force of the door which is prevented from occurring by an auto closing device.

In one embodiment, a refrigerator includes: a cabinet having a storage space; a hinge bracket coupled to the cabinet; a door rotatably coupled to a shaft provided on the hinge bracket and configured to open and close the storage space; and an auto closing device installed in the door at a position spaced apart from a rotational center line of the door and configured to interact with the hinge bracket in a process of closing the door to automatically close the door. Thus, closing force may be provided to the door by an auto closing device regardless of a thickness of the door.

The auto closing device may include a lever configured to rotate based on a rotational center line spaced apart from a rotational center line of the door. The auto closing device may further include an elastic member connected to the lever. The auto closing device may further include a body installed in the door to rotatably support the lever.

The elastic member may include a torsion spring, and since the latter rotates, a phenomenon in which closing force of the door is excessive when the door is closed, and thus, the door is opened again after closing the door may be prevented.

The rotational center line of the lever may extend in a vertical direction. The rotational center line of the lever may be parallel to the rotational center line of the door.

A portion of the lever may be accommodated in the body and connected to the elastic member, and the other portion of the lever may be configured to extend to an outside of the body and be in contact with a contact surface of the hinge bracket in the process of closing the door.

The lever may be bent once or more times in a horizontal direction, and a roller may be rotatably connected to an end of the lever.

The auto closing device may further include a connector configured to connect the elastic member to the lever in the body.

The lever may include: a first part connected to the connector in the body; a second part configured to extend outward from the first part; and a third part which is configured to extend from the second part and to which a roller is coupled.

The second part may be bent once or more times in a horizontal direction and have a height that varies in a longitudinal direction. The third part may be disposed higher than the first part, and the roller may be coupled to a lower side of the third part.

A portion of the body may be accommodated in an accommodation portion provided at a lower side of the door, and the other portion of the body may protrude downward from the door. The lever may be rotatably connected to the portion of the body, which protrudes downward from the door.

The connector may include: a lever coupling portion coupled to the lever; an elastic member coupling portion coupled to the elastic member; and a partition plate provided between the lever coupling portion and the elastic member.

The lever coupling portion may be coupled to the lever by passing through the lever from an upper side of the lever, the partition plate may be seated on the lever, and the elastic member coupling portion may be disposed above the partition plate.

The elastic member may include: a body portion provided by winding a wire several times; and an extension portion configured to extend in a horizontal direction from a lower side of the body portion. The extension portion may be coupled to the elastic member coupling portion.

The auto closing device may further include a connector which has a fixed position in the body and to which the elastic member is connected.

The elastic member may have one end connected to the connector and fixed in position and the other end connected to the lever to rotate together with the lever.

In the state in which the door is closed, the rotational center line of the lever may be disposed closer to the front surface of the cabinet than the rotational center line of the door.

In the state in which the door is closed, the body may be disposed closer to a front surface of the door than a rear surface of the door. A portion of the lever, which is in contact with the contact surface, may be disposed closer to the rear surface of the door than a rotational center line of the lever.

The hinge bracket may include: a coupling portion fixed to the cabinet; and a bracket body configured to extend from the coupling portion in a horizontal direction and provided with a contact surface that is in contact with the lever.

When the door is closed, elastic force may be accumulated in the elastic member while the lever moves along a partial section of the contact surface, and in the other section of the contact surface, the elastic force of the elastic member may act on the lever so that the door is automatically closed.

In another embodiment, a refrigerator includes: a cabinet having a storage space; a hinge bracket coupled to the cabinet; a door rotatably coupled to a shaft provided on the hinge bracket and configured to open and close the storage space; and an auto closing device installed in the door at a position spaced apart from a rotational center line of the door and configured to interact with the hinge bracket in a process of closing the door to automatically close the door, wherein the auto closing device includes: a lever configured to rotate based on a rotational center line spaced apart from a rotational center line of the door; and a torsion spring connected to the lever.

In further another embodiment, a refrigerator includes: a door; and an auto closing device that operates to automatically close the door, wherein the auto closing device includes: a lever configured to rotate based on a rotational center line spaced apart from a rotational center line of the door; and an elastic member connected to the lever, wherein, in the state in which the door is closed, the rotational center line of the door is disposed closer to a front surface of the door than a rear surface of the door, and the rotational center line of the lever is disposed closer to the rear surface of the door than the rotational center line of the door.

The refrigerator may further include a hinge bracket coupled to the cabinet and provided with a shaft configured to provide the rotational center of the door. The hinge bracket may include a contact surface that is in contact with the lever in the process of closing the door.

In the state in which the door is closed, a portion of the contact surface, which is in contact with the lever, may be disposed closer to the rear surface of the door than the rotational center line of the lever.

According to the proposed embodiment, since the auto closing device is disposed to be spaced apart from the rotational center line of the door, even when the thickness of the door is reduced, the closing force may be provided to the door when the door is closed.

According to this embodiment, when the door is closed by the auto closing device, the phenomenon in which the door is closed and then opened again due to the excessive closing force of the door may be prevented from occurring.

According to this embodiment, the height of the auto closing device may be reduced, and as the height of the lever is bent to be variable, the interference with other doors may be prevented during the operation of the lever.

DETAILED DESCRIPTION

Figure 1:
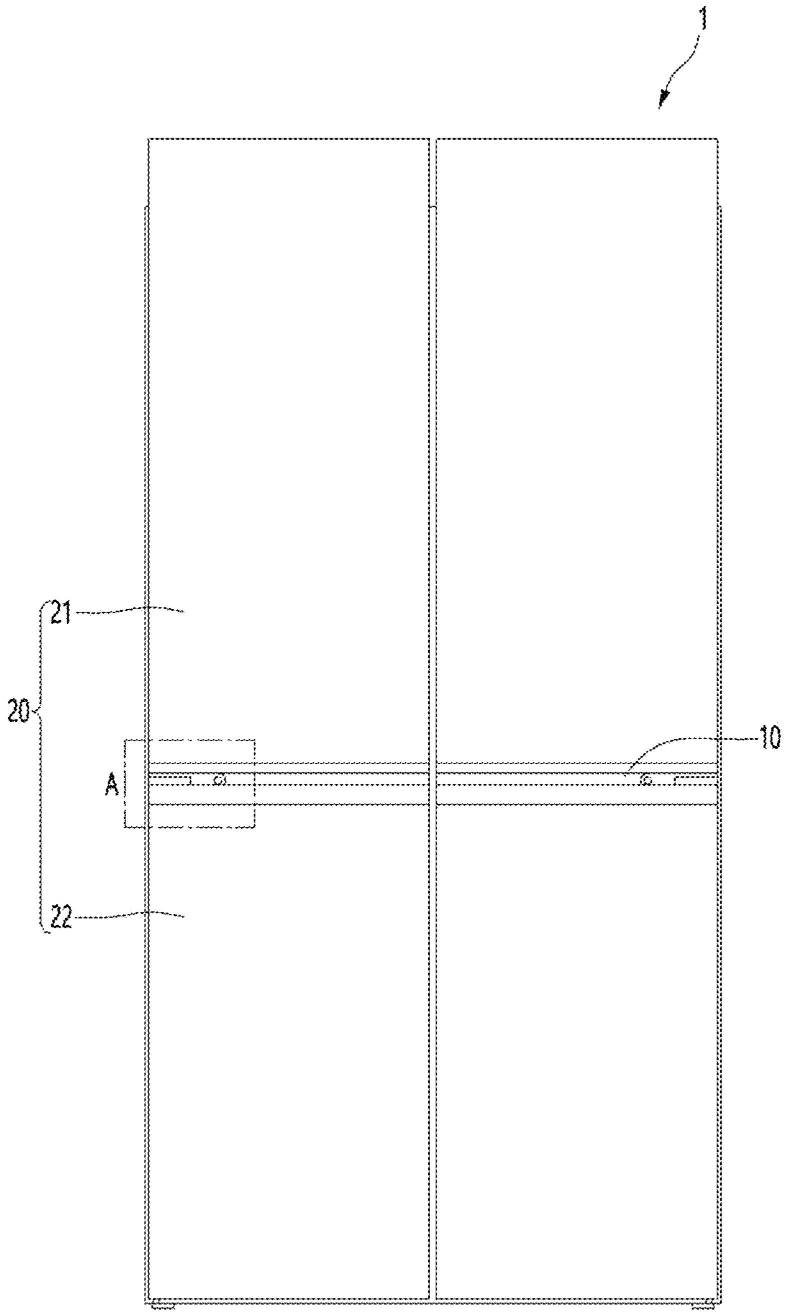
FIG. 1 is a front view of a refrigerator according to an embodiment.

Hereinafter, embodiments of the present disclosure will be described in detail with reference to the accompanying drawings. It should be noted that when components in the drawings are designated by reference numerals, the same components may have the same reference numerals even though the components are illustrated in different drawings. Further, in description of embodiments of the present disclosure, when it is determined that detailed descriptions of well-known configurations or functions obscure the understanding of the embodiments of the present disclosure, the detailed descriptions may be omitted.

Also, in the description of the embodiments of the present disclosure, the terms such as first, second, A, B, (a) and (b) may be used. Each of the terms is merely used to distinguish the corresponding component from other components, and does not delimit an essence, an order or a sequence of the corresponding component. It should be understood that when one component is “connected”, “coupled” or “joined”

to another component, the former may be directly connected or jointed to the latter or may be "connected", coupled" or "joined" to the latter with a third component interposed therebetween.

Figure 2:
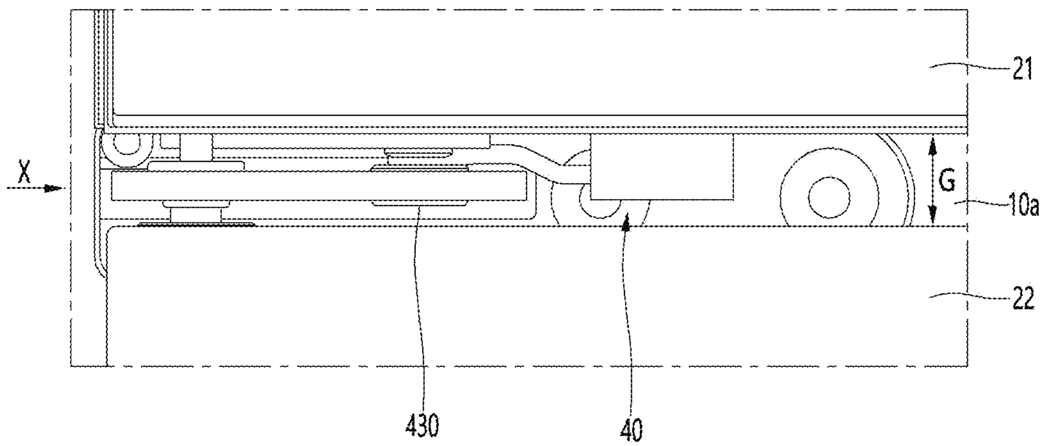
FIG. 2 is an enlarged view illustrating a portion A of FIG. 1.
Figure 3:
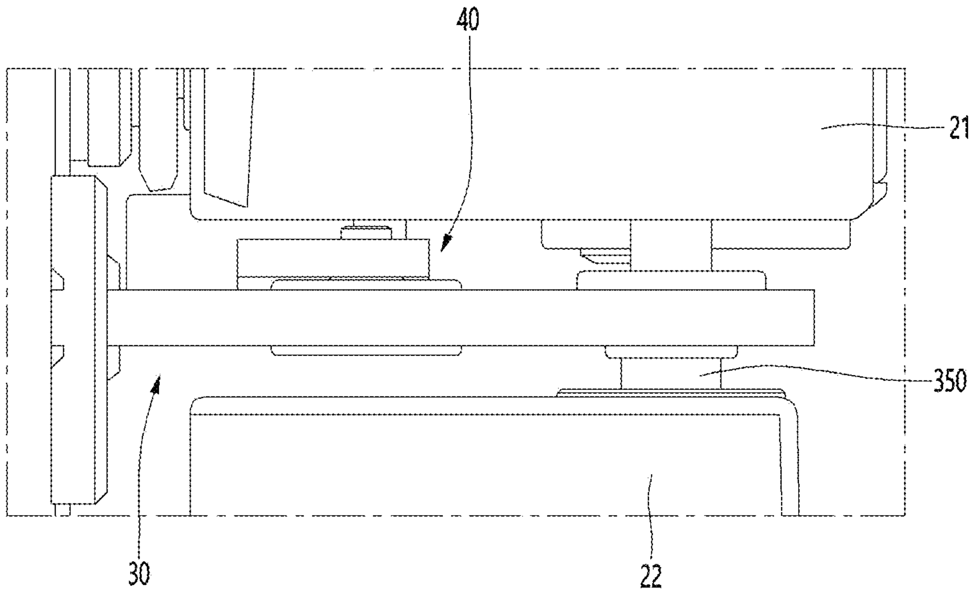
FIG. 3 is a view illustrating a configuration of FIG. 2 when viewed in an X direction.

FIG. 1 is a front view of a refrigerator according to an embodiment, FIG. 2 is an enlarged view illustrating a portion A of FIG. 1, and FIG. 3 is a view illustrating a configuration of FIG. 2 when viewed in an X direction.

Referring to FIGS. 1 to 3, a refrigerator 1 according to an embodiment may be installed independently in a kitchen or installed in an indoor furniture cabinet or wall. When the refrigerator 1 is installed in the indoor furniture cabinet or wall, the refrigerator 1 may be installed alone or arranged side by side with another refrigerator.

The refrigerator 1 may include a cabinet 10 having a storage space and a refrigerator door 20 that opens and closes the storage space.

The storage space may not be limited, but may be divided into an upper first space and a lower second space, and the refrigerator door 20 may also include a first door 21 that opens and closes the first space and a second door 22 that opens and closes the second space.

The first space may be a refrigerating compartment, and the second space may be a freezing compartment or vice versa. Alternatively, the storage space may include a first space and a second space, which are divided into left and right sides. Alternatively, the storage space may be a single space, and a single refrigerator door may open and close the storage space.

At least one or more of the first door 21 and the second door 22 may be a rotation type door. Alternatively, the single refrigerator door 20 may be a rotation type door.

In this embodiment, the rotation type refrigerator door 20 may include an auto closing device 40 that provides closing force to the refrigerator door 20 in a state in which the refrigerator door 20 is opened and then closed again at a certain angle.

In FIG. 2, an example in which the auto closing device 40 is provided in the first door among the first door and the second door, which are arranged in a vertical direction will be described. It should be noted that the position of the auto closing device 40 is not limited.

When the first door 21 and the second door 22 are arranged in the vertical direction, a hinge bracket 30 is provided between the first door 21 and the second door 22.

The hinge bracket 30 may be a bracket that provides a rotational center for each of the first door 21 and the second door 22. Alternatively, the hinge bracket may be disposed at an upper side of the first door 21, and the hinge bracket may also be disposed at a lower side of the second door 22. Alternatively, the hinge bracket 30 may provide a rotational center of the first door 21, and a separate hinge bracket may provide a rotational center of the second door 22.

The hinge bracket 30 may be fixed to a front surface 10*a* of the cabinet 10. The hinge bracket 30 may include a shaft member 350. The shaft member 350 may include a shaft for the first door 21 (to be described later) and a shaft for the second door 22 (to be described later).

A gap G having a predetermined size is defined between the first door 21 and the second door 22. A portion of the hinge bracket 30 is disposed between the first door 21 and the second door 22 so that the first door 21 and the second door 22 may rotate without interfering with each other, and also is spaced apart from a top surface of the second door 22 as well as a bottom surface of the first door 21.

The auto closing device 40 according to this embodiment may provide closing force to the first door 21 in a process of closing the first door 21 while acting with the hinge bracket 30. Alternatively, the auto closing device 40 may provide the closing force to the second door 22.

In order for the auto closing device 40 to provide the closing force to the first door 21, the auto closing device 40 may be installed in the first door 21.

For example, the auto closing device 40 may be installed at a lower side of the first door 21, and in order to interact with the hinge bracket 30, a portion of the auto closing device 40 may protrude downward from the bottom surface of the first door 21.

When the auto closing device 40 is installed at the lower side of the first door 21, the auto closing device 40 may not be easily seen from the outside while the first door 21 is opened and closed.

The auto closing device 40 may be spaced apart from a top surface of the second door 22 so that the auto closing device 40 does not interfere with the second door 22.

Figure 4:
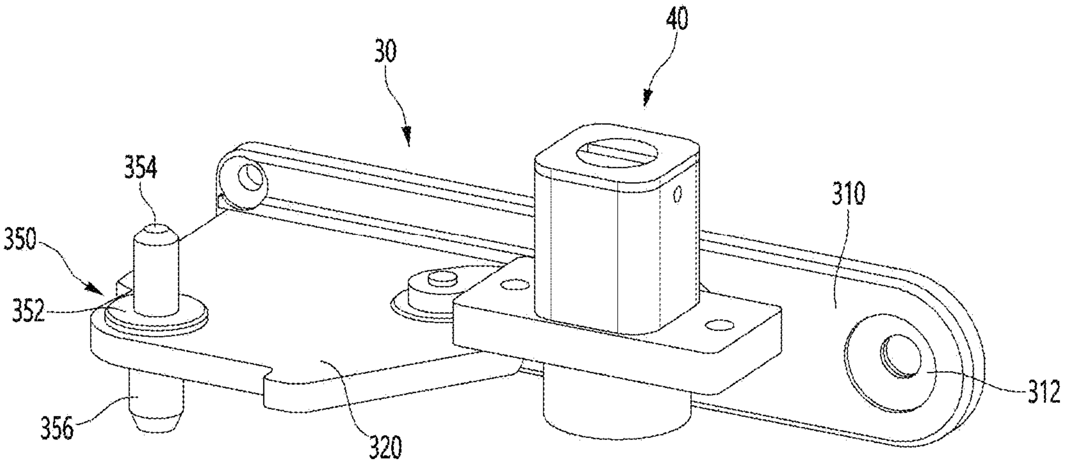
FIG. 4 is a perspective view illustrating a hinge bracket and an auto closing device according to an embodiment.

FIG. 4 is a perspective view illustrating the hinge bracket and the auto closing device according to an embodiment.

For example, FIG. 4 illustrates relative positions of the auto closing device 40 and the hinge bracket in the state in which the first door 21 is closed.

Referring to FIGS. 3 and 4, the hinge bracket 30 may include a coupling portion 310 to be coupled to the cabinet 10, and a bracket body 320 extending horizontally from the coupling portion 310. For example, the coupling portion 310 may be coupled to the front surface 10*a* of the cabinet 10.

The coupling portion 310 may include one or more coupling holes 312. A coupling member may be coupled to the cabinet 10 through the coupling holes 312.

A height of the bracket body 320 may be less than that of the coupling portion 310. The bracket body 320 may extend in a horizontal direction from a position spaced apart from upper and lower ends of the coupling portion 310. For example, the bracket body 320 may extend from an intermediate portion of the coupling portion 310.

A shaft member 350 may be coupled to the bracket body 320.

The shaft member 350 may include a seating portion 352 seated on the bracket body 320, a first shaft 354 extending upward from the seating portion 352, and a second shaft 356 extending downward from the seating portion 352.

Alternatively, the second shaft 356 may be omitted from the shaft member 350.

A diameter of the seating portion 352 may be greater than that of the second shaft 356. A hole (not shown) through which the second shaft 356 passes may be defined in the bracket body 320.

The second shaft 356 may pass through the hole of the bracket body 320 from an upper side of the bracket body 320, and the seating portion 352 may be seated on a top surface of the bracket body 320.

A diameter of the first shaft 354 is less than that of the seating portion 352. The diameter of the first shaft 354 may be the same as or different from that of the second shaft 356.

The first door 21 may be coupled to the first shaft 354, and the second door 22 may be coupled to the second shaft 356.

Thus, the first shaft 354 may provide a rotational center of the first door 21, and the second shaft 356 may provide a rotational center of the second door 22.

The auto closing device 40 may be disposed at a position spaced apart from the first shaft 354 in the horizontal direction. That is, the auto closing device 40 may be coupled to the first door 21 at a position spaced apart from the first shaft 354.

The auto closing device 40 rotates together with the first door 21, and in the process of closing the first door 21, the auto closing device 40 interacts with the bracket body 320 to provide the closing force to the first door 21.

Hereinafter, the auto closing device 40 will be described in detail.

Figure 5:
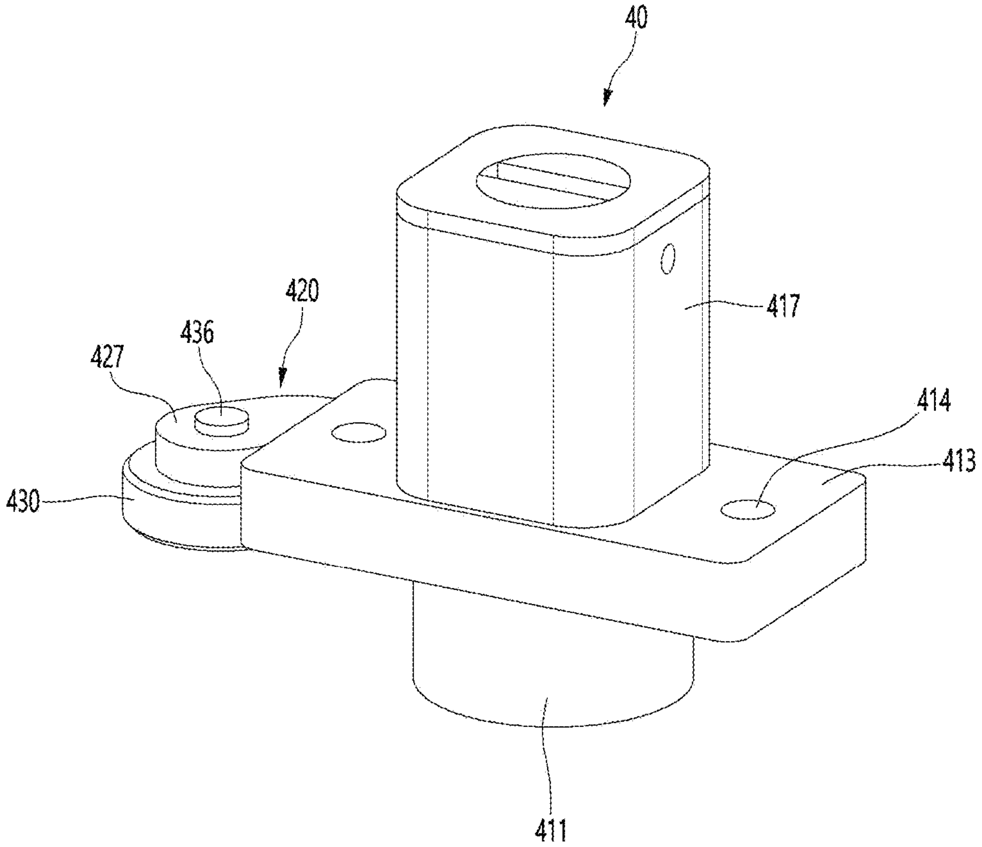
FIG. 5 is a perspective view of the auto closing device when viewed from the above according to an embodiment.
Figure 6:
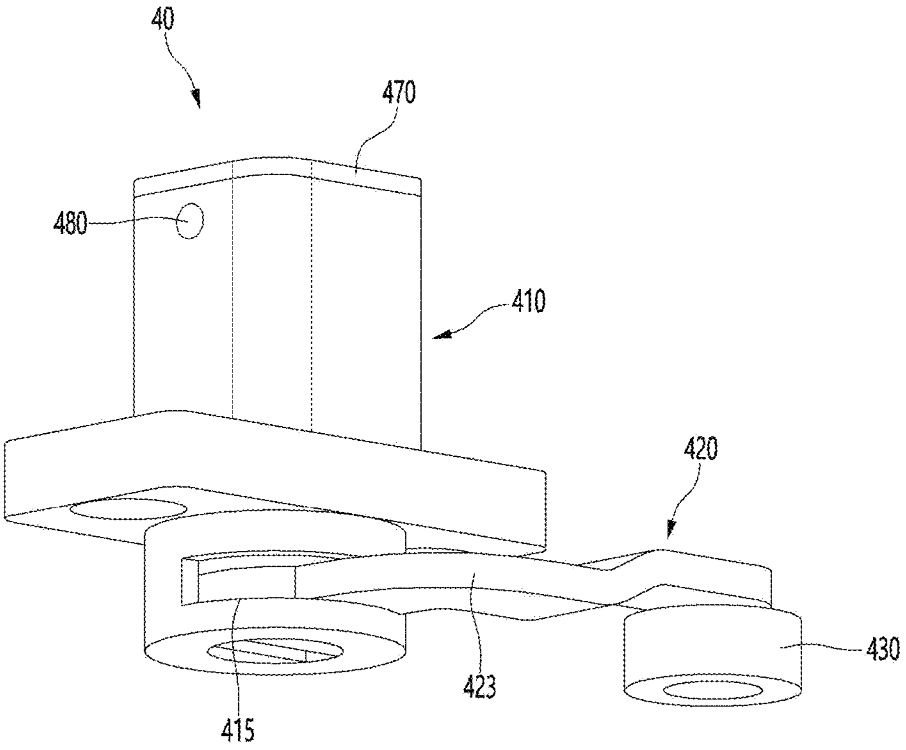
FIG. 6 is a perspective view of the auto closing device when viewed from the below according to an embodiment.
Figure 7:
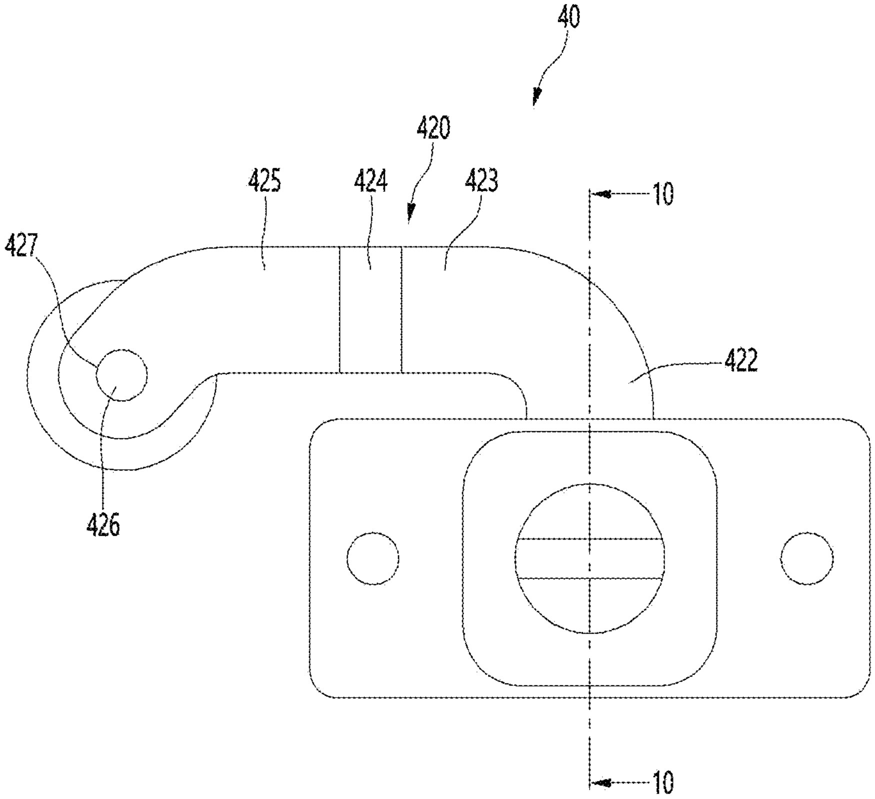
FIG. 7 is a plan view of the auto closing device according to an embodiment.
Figure 8:
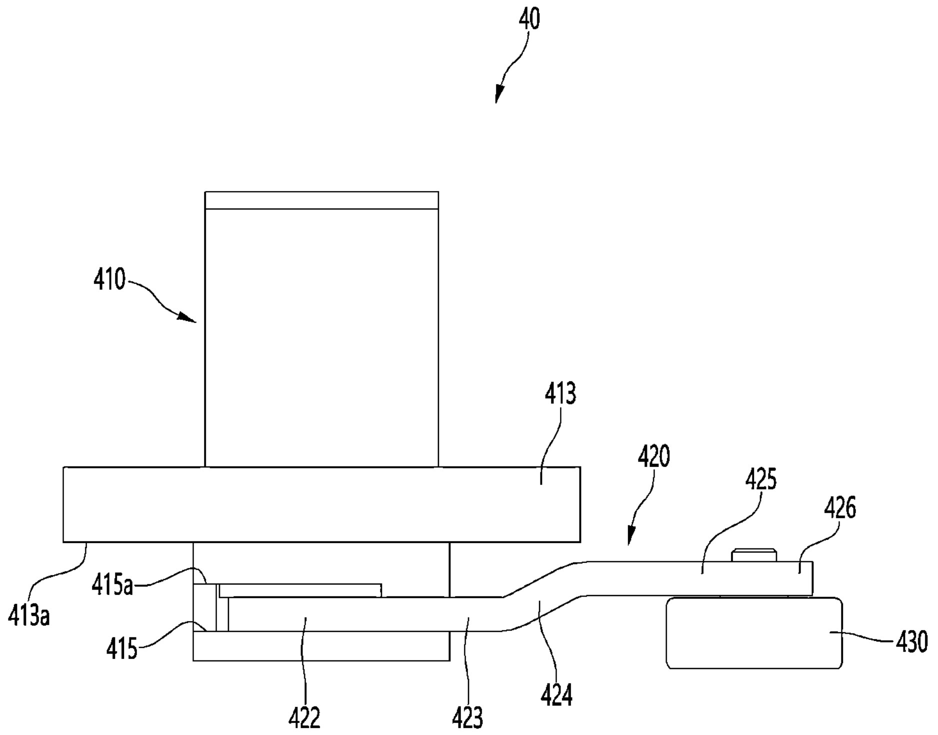
FIG. 8 is a side view of the auto closing device according to an embodiment.
Figure 9:
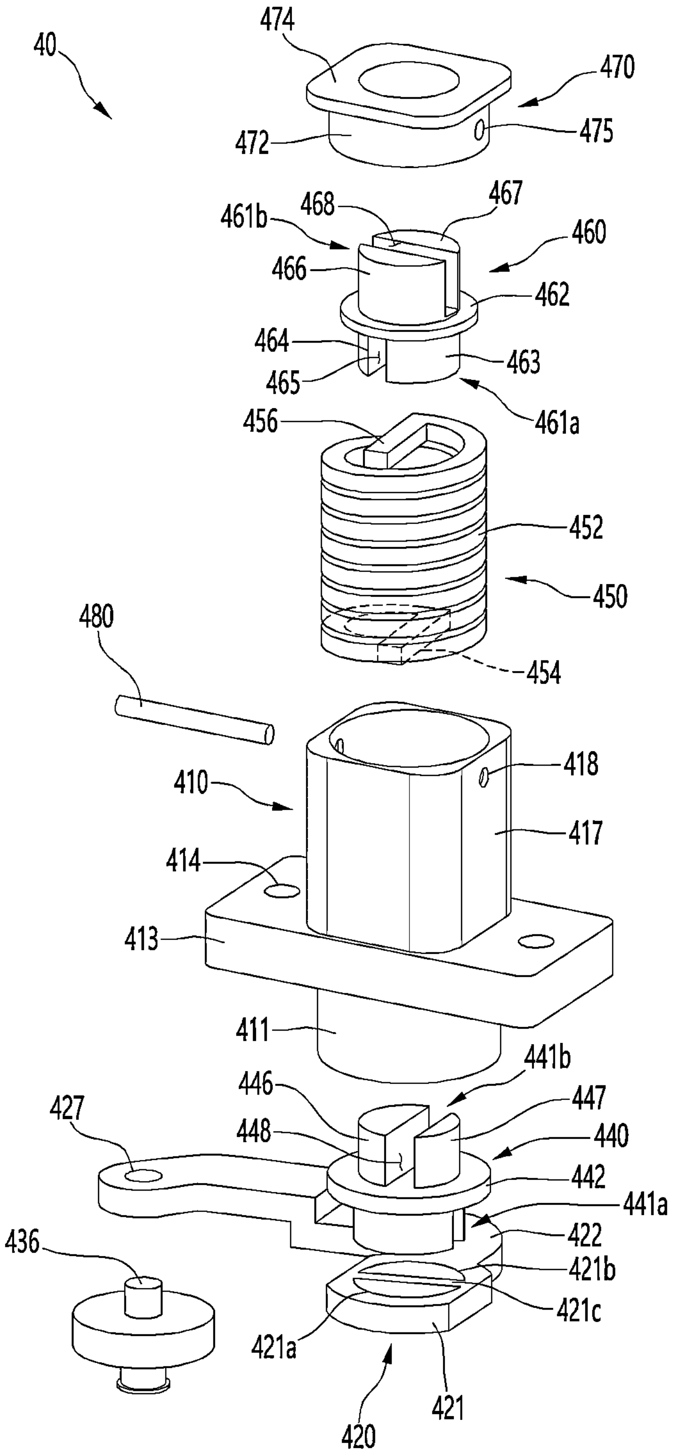
FIG. 9 is an exploded perspective view of the auto closing device according to an embodiment.
Figure 10:
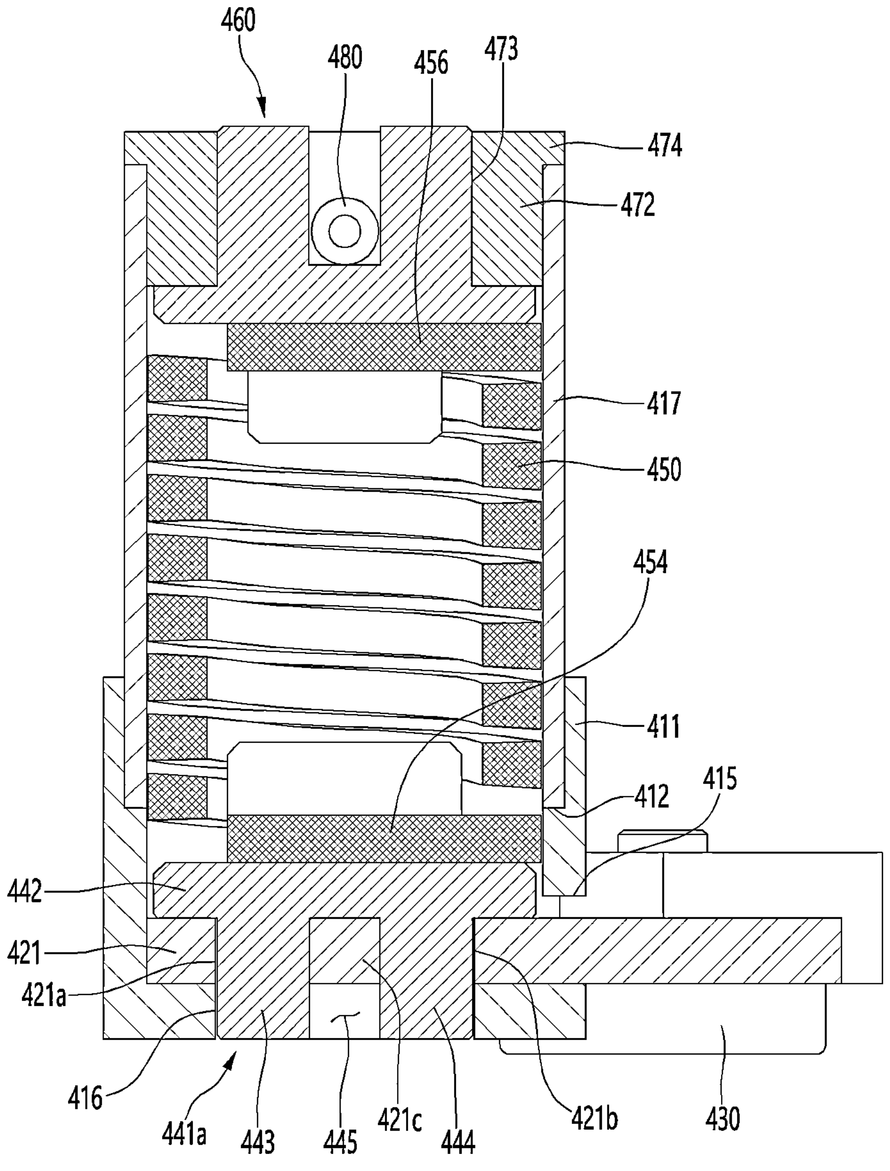
FIG. 10 is a cross-sectional view taken along line 10-10 of FIG. 7.

FIG. 5 is a perspective view of the auto closing device when viewed from the above according to an embodiment, FIG. 6 is a perspective view of the auto closing device when viewed from the below according to an embodiment, FIG. 7 is a plan view of the auto closing device according to an embodiment, and FIG. 8 is a side view of the auto closing device according to an embodiment. FIG. 9 is an exploded perspective view of the auto closing device according to an embodiment, and FIG. 10 is a cross-sectional view taken along line 10-10 of FIG. 7.

Referring to FIGS. 5 to 10, the auto closing device 40 according to this embodiment may include a body 410, a lever 420 rotatably coupled to the body 410, and an elastic member 450 connected to the lever 420.

The body 410 may define an outer appearance of the auto closing device 40.

The body 410 may accommodate a portion of the lever 420. In a state in which a portion of the lever 420 is accommodated in the body 410, the lever 420 may rotate. For example, the lever 420 may rotate in the horizontal direction based on a rotational center line extending in the vertical direction. That is, the rotational center line of the first door 21 and the rotational center line of the lever 420 may be parallel to each other and spaced apart from each other in the horizontal direction.

The body 410 may include a slot 415 into which a portion of the lever 420 is inserted. The lever 420 may pass through the slot 415 in a lateral direction of the body 410 and be inserted into the body 410.

The slot 415 may extend to be elongated in a circumferential direction so that the lever 420 rotates in a state of passing through the slot 415.

The body 410 may include a first body 411 and a second body 417 coupled to the first body 411.

The second body 417 may be coupled to the first body 411 at an upper side of the first body 411. The first body 411 includes an upper opening and a lower opening, and a lower side of the second body 417 may be inserted through the upper opening of the first body 411.

The first body 411 may include a seating groove 412 in which the second body 417 is seated. In the state in which the first body 417 is seated in the seating groove 412 of the first body 411, an inner circumferential surface of the second body 417 may define a continuous surface in a vertical direction with an inner circumferential surface of the first body 411.

The slot 415 may be defined in the first body 411.

One or more coupling extension portions 413 may be provided on the first body 411. A coupling hole 414 may be defined in the coupling extension portion 413. Although not limited, a plurality of coupling extension portions 413 may be disposed to extend horizontally from the first body 411. As an example, FIG. 9 illustrates that a pair of coupling extension portions 413 extend in directions away from each other from the first body 411. The coupling extension portion 413 may be coupled to the first door 21.

The coupling extension portion 413 may be disposed at a position spaced a predetermined distance upward from a lower end of the first body 411. The coupling extension portion 413 extends in a horizontal direction from the first body 411, and the slot 415 is disposed lower than the coupling extension portion 413 in the first body 411.

An upper end 415*a* of the slot 415 may be disposed lower than a lower end 413*a* of the coupling extension portion 413.

The auto closing device 40 may further include a first connector 440 connected to the lever 420 within the body 410.

The first connector 440 may be connected to the lever 420 to rotate together with the lever 420. The first connector 440 may be coupled to the lever 420 by passing through the lever 420 downward from the upper side of the lever 420 inserted into the body 410. For example, the first connector 440 may be inserted into the first body 411 through the upper opening of the first body 411 and coupled to the lever 420.

The first connector 440 may connect the elastic member 450 to the lever 420. The first connector 440 may include a lever coupling portion 441*a* and a first elastic member coupling portion 441*b*.

The first connector 440 may further include a partition plate 442 disposed between the lever coupling portion 441*a* and the first elastic member coupling portion 441*b*. The lever coupling portion 441a may be provided below the partition plate 442 based on the partition plate 442, and the first elastic member coupling portion 441*b* may be provided above the partition plate 442 based on the partition plate 442.

The lever coupling portion 441*a* may include a first rib 443 and a second rib 444, which are spaced apart from each other in a horizontal direction. A first coupling space 445 may be defined between the first rib 443 and the second rib 444. Surfaces of the first rib 443 and the second rib 444, which face each other, may include a plane. An outer surface of each of the first rib 443 and the second rib 444 may include a rounded surface that is rounded in the horizontal direction.

Thus, each of the first rib 443 and the second rib 444 has a semicircle or a shape similar to a semicircle in horizontal cross-section.

The lever 420 may include a first rib hole 421*a* through which the first rib 443 passes, and a second rib hole 421*b* through which the second rib 444 passes. The first rib hole 421*a* may have a shape and size corresponding to those of the first rib 443, and the second rib hole 421*b* may have a shape and size corresponding to those of the second rib 444.

Since the first rib hole 421*a* and the second rib hole 421*b* are spaced apart from each other, a coupling rib 421*c* exists between the first rib hole 421*a* and the second rib hole 421*b*.

When the first rib 443 passes through the first rib hole 421*a*, and the second rib 444 passes through the second rib hole 421*b*, the coupling rib 412*c* may be accommodated in the first coupling space 445, and thus, the lever coupling portion 441*a* and the lever 420 are completely coupled to each other. Here, the partition plate 442 is seated on the top surface of the lever 420.

The first body 411 includes a lower opening 416, and the lever coupling portion 441*a* passing through the lever 420 is accommodated in the lower opening 416.

The first elastic member coupling portion 441*b* may include a third rib 446 and a fourth rib 447, which are spaced apart from each other in a horizontal direction. A second coupling space 448 may be defined between the third rib 446 and the fourth rib 447.

A separation direction between the third rib 446 and the fourth rib 447 may intersect with a separation direction between the first rib 443 and the second rib 444.

Surfaces of the third rib 446 and the fourth rib 447, which face each other, may include a plane. An outer surface of each of the third rib 446 and the fourth rib 447 may include a rounded surface that is rounded in the horizontal direction. Thus, each of the third rib 446 and the fourth rib 447 has a semicircle or a shape similar to a semicircle in horizontal cross-section.

A portion of the elastic member 450 may be accommodated in the second coupling space 448.

The lever 420 may include a first portion 421 coupled to the first connector 440. The first portion 421 may also be referred to as a connector coupling portion.

The first portion 421 may pass through the slot 415 and be inserted into the body 410.

The lever 420 may include a second portion 422 extending in the horizontal direction from the first portion 421. The second portion 422 may extend while maintaining the same height as the first portion 421.

The second portion 422 is a portion extending outward from the body 410. In this embodiment, the first portion 421 or the second portion 422 is disposed in the slot 415. Hereinafter, a configuration in which the first portion 421 is disposed in the body 410, a portion of the second portion 422 is disposed in the slot 415, and the other portion is disposed outside the body 410, will be described as an example.

The lever 420 may further include a third portion 423 bent in the horizontal direction from the second portion 422. The third portion 423 may be bent while being rounded at the second portion 422, and the second part 422 and the third part 423 may be disposed to be angled at an angle of about 90 degrees.

The lever 420 may further include a fourth portion 424 extending to be inclined upward from the third portion 423.

The lever 420 may further include a fifth portion 425 extending in the horizontal direction from the fourth portion 424. The fifth portion 425 may be disposed higher than the third portion 423. The fifth portion 425 may extend substantially parallel to the third portion 423.

The lever 420 may further include a sixth portion 426 inclined at a predetermined angle in the horizontal direction from the fifth portion 425.

The sixth portion 426 may extend at an angle of approximately 45 degrees from the fifth portion 425.

The sixth portion 426 may be in contact with the bracket body 320. Alternatively, the lever 420 may include a roller 430 that is coupled to the sixth portion 426 and is in contact with the bracket body 320.

In this specification, a portion of the lever 420, which is in contact with the bracket body 320, may be referred to as a contact portion. In this case, the sixth portion 426 may be the contact portion, or the roller 430 may be the contact portion. FIG. 8 illustrates an example in which the roller 430 is provided on the sixth portion 426. The roller 430 may be rotatably coupled to the sixth portion 426. When the rotation roller 430 is in contact with the bracket body 320, frictional force may be reduced more than when the sixth portion 426 is in contact with the bracket body 320, and wear due to friction may be reduced.

In this embodiment, since the sixth portion 426 is disposed higher than the first to third portions 421 and 423, the roller 430 may be rotatably coupled to a lower side of the sixth portion 426 to prevent the roller 430 from interfering with the second door 22.

As described above, when the roller 430 is coupled to a portion higher than the portion connected to the body 410, an increase in height of the auto closing device 40 may be prevented, and abrasion of the portion that is in contact with the bracket body may be reduced.

The roller 430 may be coupled to the sixth portion 426 by a pin 436. A pin coupling hole 427 to which the pin 436 is coupled may be defined in the sixth portion 426.

Describing the lever 420 according to another aspect, the lever 420 includes a first part connected to the first connector 440 within the body 410, a second part extending outward from the first part, and a third part which extends from the second part and to which the roller 430 is coupled.

The second part may be bent one or more times in a horizontal direction and have a height that varies in a longitudinal direction. Thus, the third part may be stepped from the first part and, for example, may be disposed higher than the first part.

For example, the first part may include the first portion 421, the second part may include the second to fifth portions 422 to 425, and the third part may include the sixth portion 426.

A thickness (width in the vertical direction) of the roller 430 may be greater than a thickness (width in the vertical direction) of at least the sixth portion 426. A diameter of the roller 430 may be greater than a width of at least the second portion 426.

The thickness of the roller 430 may be greater than the thickness (vertical width) of the bracket body 320.

The elastic member 450 may be, for example, a torsion spring. The elastic member 450 may include a body portion 452 provided by winding a wire multiple times. The body portion 452 may have a cylindrical or truncated cone shape.

A vertical cross-section of a wire defining the body portion 452 may be non-circular. For example, a vertical cross-section of the wire may be a quadrangular shape.

In this embodiment, the diameter of the body portion 452 may be reduced when the vertical cross-section of the wire defining the body portion 452 has the same modulus of elasticity as compared to the case in which the vertical cross-section has a circular shape.

The elastic member 450 may include a first extension portion 454 extending horizontally from a lower end of the body portion 452.

The first extension portion 454 may extend toward a center of the body portion 452. The first extension portion 454 may be coupled to the first connector 440. For example, the first extension portion 454 may be inserted into the second coupling space 448 of the first elastic member coupling portion 441*b*.

A vertical length of the second coupling space 448 is greater than a height of the first extension portion 454. Thus, the first extension portion 454 is prevented from falling out of the second coupling space 448 while being accommodated in the second coupling space 448.

In addition, when the first extension portion 454 is accommodated in the second coupling space 448, the first elastic member coupling portion 441*b* may be accommodated inside the body portion 452. That is, the body portion 452 may be coupled to the first elastic member coupling portion 441*b* while surrounding the first elastic member coupling portion 441*b*.

In the state in which the first extension portion 454 is accommodated in the second coupling space 448, the first extension portion 454 and the body 452 may be seated on the partition plate 442.

The elastic member 450 may further include a second extension portion 456 extending horizontally from an upper end of the body portion 452.

The auto closing device 40 may further include a second connector 460 coupled to the elastic member 450. The second extension portion 456 may be coupled to the second connector 460.

The second connector 460 may be provided in the same or similar shape as the first connector 440.

The second connector 460 may include a second elastic member coupling portion 461*a* and a pin coupling portion 461*b*. The second connector 460 may further include a partition plate 462 disposed between the second elastic member coupling portion 461*a* and the pin coupling portion 461*b*.

The pin coupling portion 461*b* may be provided above the partition plate 462 based on the partition plate 462, and the second elastic member coupling portion 461*a* may be provided below the partition plate 462 based on the partition plate 462.

The second elastic member coupling portion 461*a* may include a first rib 463 and a second rib 464, which are spaced apart from each other in the horizontal direction. A first coupling space 465 may be defined between the first rib 463 and the second rib 464. Surfaces of the first rib 463 and the second rib 464, which face each other, may include a plane. An outer surface of each of the first rib 463 and the second rib 464 may include a rounded surface that is rounded in the horizontal direction.

The second extension portion 456 of the elastic member 450 may be inserted into the first coupling space 465. A vertical length of the first coupling space 465 is greater than a height of the second extension portion 456. Thus, the second extension portion 456 is prevented from falling out of the first coupling space 465 while being accommodated in the first coupling space 465.

In addition, when the second extension portion 456 is accommodated in the first coupling space 465, the second elastic member coupling portion 461*a* may be accommodated in the body portion 452. That is, the body portion 452 may be coupled to the second elastic member coupling portion 461*a* while surrounding the second elastic member coupling portion 461*a*.

The pin coupling portion 461*b* may include a third rib 466 and a fourth rib 467, which are spaced apart from each other in the horizontal direction. A second coupling space 468 may be defined between the third rib 466 and the fourth rib 467.

A separation direction between the third rib 466 and the fourth rib 467 may intersect with a separation direction between the first rib 463 and the second rib 464.

Surfaces of the third rib 466 and the fourth rib 467, which face each other, may include a plane. An outer surface of each of the third rib 466 and the fourth rib 467 may include a rounded surface that is rounded in the horizontal direction. Thus, each of the third rib 466 and the fourth rib 467 has a semicircle or a shape similar to a semicircle in horizontal cross-section.

The auto closing device 40 may further include an upper cap 474 covering the upper opening of the body 410.

The upper cap 474 may include a cap body 472 having a hollow 473 therein, and a flange 474 extending from an upper end of the cap body 472 in the horizontal direction.

The cap body 472 may be inserted into the body 410, and the flange 474 may be seated on the top surface of the body 410. The pin coupling portion 461*b* is inserted into the hollow 473.

The auto closing device 40 may further include a fixing pin 480 for fixing the upper cap 474 to the body 410.

A pair of first pin holes 418 through which the fixing pins 480 pass may be defined in the body 410.

The cap body 472 may include a pair of second pin holes 475 through which the fixing pin 480 passes.

The fixing pin 480 may be inserted into the second coupling space 468. That is, after passing through one first pin hole 418 and one second pin hole 475, the fixing pin 480 may pass through the second coupling space 468 and pass through the other second pin hole 475 and the other first pin hole 418.

The positions of the upper cap 470 and the second connector 460 are fixed to the body 410 by the fixing pin 480. That is, rotation of the upper cap 470 and the second connector 460 is restricted by the fixing pin 480.

That is, in this embodiment, the second extension portion 456 of the elastic member 450 is a fixed end, and the first extension portion 454 is a movable end. Thus, in a state in which the second extension portion 456 is fixed, the first extension portion 454 is rotatable together with the lever 420.

When the first extension portion 454 of the elastic member 450 rotates in one direction while the second extension portion 456 is fixed, the elastic member 450 accumulates elastic force. The elastic force accumulated by the elastic member 450 may act on the lever 420 so that the lever 420 rotates in another direction opposite to the one direction.

In this manner, the elastic force accumulated by the elastic member 450 substantially acts on the first door 21 in the process of closing the first door 21 so that the first door 21 is automatically closed when at a predetermined position.

A structure for fixing the second extension portion 456 of the elastic member 450 described above is merely an example, and various fixing structures such as a structure in which the second extension portion 456 is directly fixed to the body 410 or the upper cap 470 may be applied.

Unlike the above embodiment, one or more of the first connector 440 and the second connector 450 may be omitted. For example, the elastic member 450 may be directly connected to the lever 420, and the elastic member 450 may be directly connected to the upper cap 470.

Figure 11:
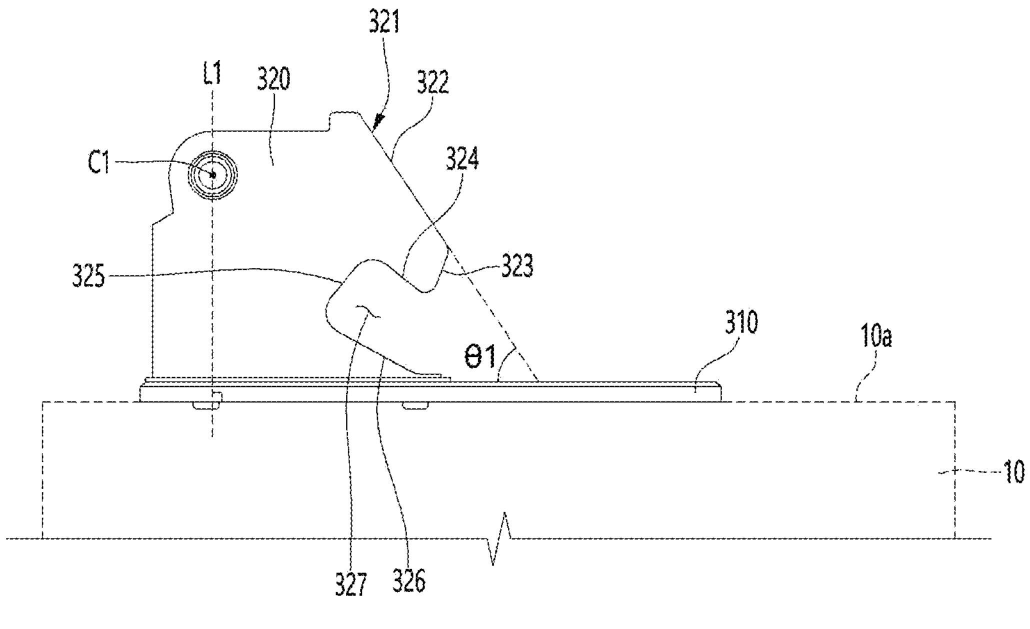
FIG. 11 is a view illustrating the hinge bracket fixed to a cabinet when viewed from the below.

FIG. 11 is a view illustrating the hinge bracket fixed to the cabinet when viewed from the below.

Referring to FIG. 11, the bracket body 320 of the hinge bracket 30 may include a contact surface 321 that is in contact with the lever 420.

For example, the roller 430 of the lever 420 may be in contact with the contact surface 321. While the lever 420 moves along the contact surface 321, the lever 420 may rotate.

The contact surface may include a first surface 322 on which the lever 420 is initially in contact with the contact surface 321 in the process of closing the first door 21. In a state where the first door 21 is opened at a predetermined angle or more, the lever 420 may not be in contact with the first surface 322, and in the process of closing the first door 21, the lever 420 may be in contact with the first surface 322.

The first surface 322 is not only disposed to be inclined with respect to the front surface 10*a* of the cabinet 10, but is also disposed to be inclined with respect to a virtual line L1 that is perpendicular to the front surface 10*a* of the cabinet 10 and passes through a rotational center or a rotational center line C1 of the first door 21. The rotational center line C1 is a line passing through the rotational center of the first door 21.

The first surface 322 may be inclined in a direction away from the virtual line L1 as the first surface 322 approaches the front surface 10*a* of the cabinet 10. The first surface 322 is inclined at a first angle 81 with the front surface 10*a* of the cabinet 10.

The contact surface 321 may further include a second surface 323 extending from the first surface 322. The second surface 323 may be inclined with respect to the first surface 322. A length of the second surface 323 may be less than that of the first surface 322.

The second surface 323 may be inclined not only with respect to the front surface 10*a* of the cabinet 10, but also with respect to the virtual line L1.

The second surface 323 may be inclined in a direction closer to the virtual line L1 as the second surface 323 approaches the front surface 10*a* of the cabinet 10.

The contact surface may further include a third surface 324 extending from the second surface 323. The third surface 324 may be inclined with respect to the second surface 323.

The third surface 324 may be inclined not only with respect to the front surface 10*a* of the cabinet 10, but also with respect to the virtual line L1.

The third surface 324 extends in a direction closer to the virtual line L1 as a distance from the front surface 10*a* of the cabinet 10 increases.

The contact surface 321 may further include a fourth surface 325 extending from the third surface 324. The fourth surface 325 may be inclined with respect to the third surface 324.

The fourth surface 325 may be inclined in a direction closer to the virtual line L1 as the fourth surface 325 approaches the front surface 10*a* of the cabinet 10.

The contact surface 321 may further include a fifth surface 326 extending from the fourth surface 325. The fifth surface 326 may be inclined with respect to the fourth surface 325. The fifth surface 326 may extend in a direction that gets closer to the virtual line L1 as the fifth surface 326 is away from the front surface 10*a* of the cabinet 10.

Among the contact surfaces 321, the third surface 324 and the fifth surface 326 are disposed to face each other in a state of being spaced apart from each other. Thus, among the contact surfaces, the third to fifth surfaces 324, 325, and 326 define a portion for the lever 420, that is, an accommodation groove 327 for accommodating the roller 430. That is, the roller 430 may be disposed in the accommodation groove 327 in the state in which the door is closed. Here, one or more of the fourth surface 325 and the fifth surface 326 may not be in contact with the roller 430 while the roller 430 is accommodated in the accommodation groove 327.

In order for the roller 430 to be disposed in the accommodation groove 327, a distance between the third surface 324 and the fifth surface 326 may be greater than the diameter of the roller 430.

Figure 12:
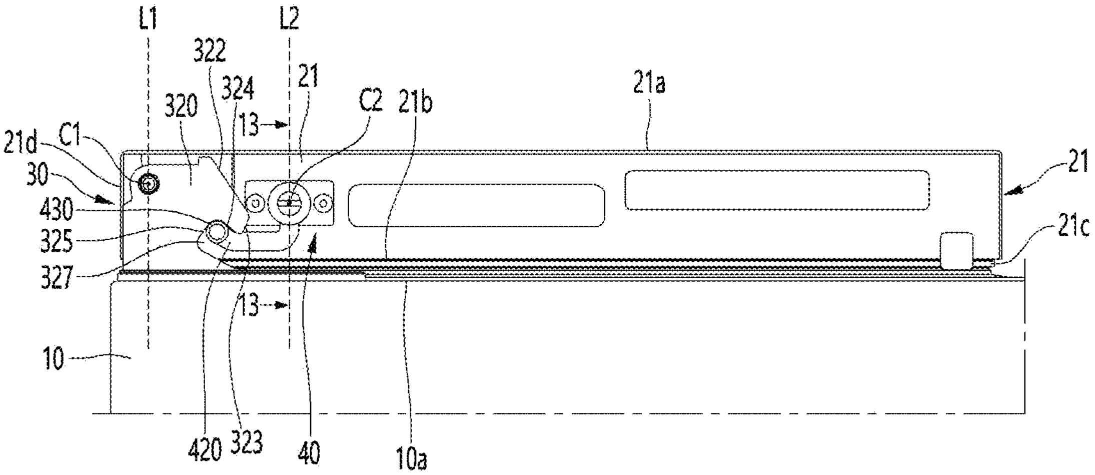
FIG. 12 is a view illustrating a position of a lever of the auto closing device in a state in which a first door is closed.

FIG. 12 is a view illustrating a position of the lever of the auto closing device in the state in which a first door is closed. FIG. 12 illustrates a view of the auto closing device viewed from a lower side of the first door.

Referring to FIG. 12, when the refrigerator according to this embodiment is installed in a furniture cabinet, it is preferable that a thickness of the first door 21 is reduced to reduce the forward protrusion of the first door 21 from the front surface of the furniture cabinet.

When the thickness of the first door 21 is reduced, in order for the auto closing device 40 to be installed in the first door 21, the auto closing device 40 may be installed at a position spaced apart from the rotational center line C1 of the first door 21.

For example, when the first door 21 is closed, the rotational center line C1 of the first door 21 and the rotational center or the rotational center line C2 of the lever 420 are spaced apart from each other. The rotational center line C2 of the lever 420 is a line passing through the rotational center of the lever 420.

In addition, when the refrigerator is installed in the furniture cabinet, an opening angle needs to be secured so that the first door 21 does not collide with the furniture cabinet during the rotation of the first door 21.

Therefore, in this embodiment, the rotational center line C1 of the first door 21 may be disposed close to the front and side surfaces of the first door 21.

For example, in the state in which the first door 21 is closed, the rotational center line C1 of the first door 21 may be disposed closer to a front surface 21*a* than a rear surface 21*b* of the first door 21.

A distance between the rotational center line C1 of the first door 21 and the rear surface 21*b* of the first door 21 may be more than twice a distance between the rotational center line C1 of the first door 21 and the front surfaces 21*a* of the first door 21.

In the state in which the first door 21 is closed, the rotational center line C1 of the first door 21 may be disposed closer to a first side surface 21*d* of the two side surfaces of the first door 21.

In the state in which the first door 21 is closed, a distance between the rotational center line C1 of the first door 21 and the first side surface 21*d* may be less than that between the rotational center line C1 of the first door 21 and the rear surface 21*b* of the first door 21.

In the state in which the first door 21 is closed, a distance between the rotational center line C1 of the first door 21 and the front surface 21*a* of the first door 21 may be less than between the front surface 21*a* of the first door 21 and the rotational center line C2 of the lever 420.

In the state in which the first door 21 is closed, a distance between the rotational center line C1 of the first door 21 and the front surface 10*a* of the cabinet 10 may be greater than that between the rotational center line C2 of the lever 420 and the front surface 10*a* of the cabinet 10.

In the state in which the first door 21 is closed, the roller 430 of the lever 420 may be disposed on an area between the virtual line L1 (first virtual line) and the virtual line L2 (second virtual line) perpendicular to the front surface 10*a* of the cabinet 10 while passing through the rotational center line C2 of the lever 420.

A gasket 21*c* that is in contact with the cabinet 10 in the state in which the first door 21 is closed may be provided on the rear surface of the first door 21. In order for the gasket 21*c* to be coupled to the first door 21, a groove in which a portion of the gasket 21*c* is accommodated may be defined in the rear surface 21*b* of the first door 21.

When the thickness of the first door 21 is thin, a distance between the gasket 21*c* and the front surface of the first door 21 is short. In the case of this embodiment, the body 410 may be disposed closer to the front surface 21*a* than the rear surface 21*b* of the first door 21 to prevent the body 410 from interfering with a groove for coupling the gasket 21*c*.

Also, in the state in which the first door 21 is closed, the roller 430 of the lever 420 may be disposed further from the front surface 10*a* of the cabinet 10 than the rotational center line C2 of the lever 420. The roller 430 of the lever 420 may be disposed closer to the rear surface 21*b* of the first door 21 than the rotational center line C2 of the lever 420.

A portion of the lever 420 may be disposed between a surface extending from the rear surface 21*b* of the first door 21 and the rotational center line C2.

In the state in which the first door 21 is closed, a portion of the first surface 322 may be disposed closer to the front surface 21*a* of the first door 21 than to the rotational center line C1 of the first door 21. In the state in which the first door 21 is closed, the other portion of the first surface 322 may be disposed closer to the rear surface 21*b* of the first door 21 than the rotational center line C1 of the first door 21.

In the state in which the first door 21 is closed, the second surface 323 and the third surface 324 may be disposed closer to the rotational center line C1 of the first door 21 than the rear surface 21*b* of the first door 21.

In the state in which the first door 21 is closed, the second surface 323 and the third surface 324 may be disposed closer to the rotational center line C2 of the lever 420 than the rear surface 21*b* of the first door 21.

The roller 430 of the lever 420 may maintain the contact with the third surface 324 and/or the fourth surface 325 while being accommodated in the accommodation groove 327.

Since a point at which the roller 430 is in contact with the third surface 324 and/or the fourth surface 325 may be greater than a boundary between the second surface 323 and the third surface 324, and the cabinet 10, in the state in which the first door 21 is closed, the closed state of the first door 21 may be stably maintained.

Figure 13:
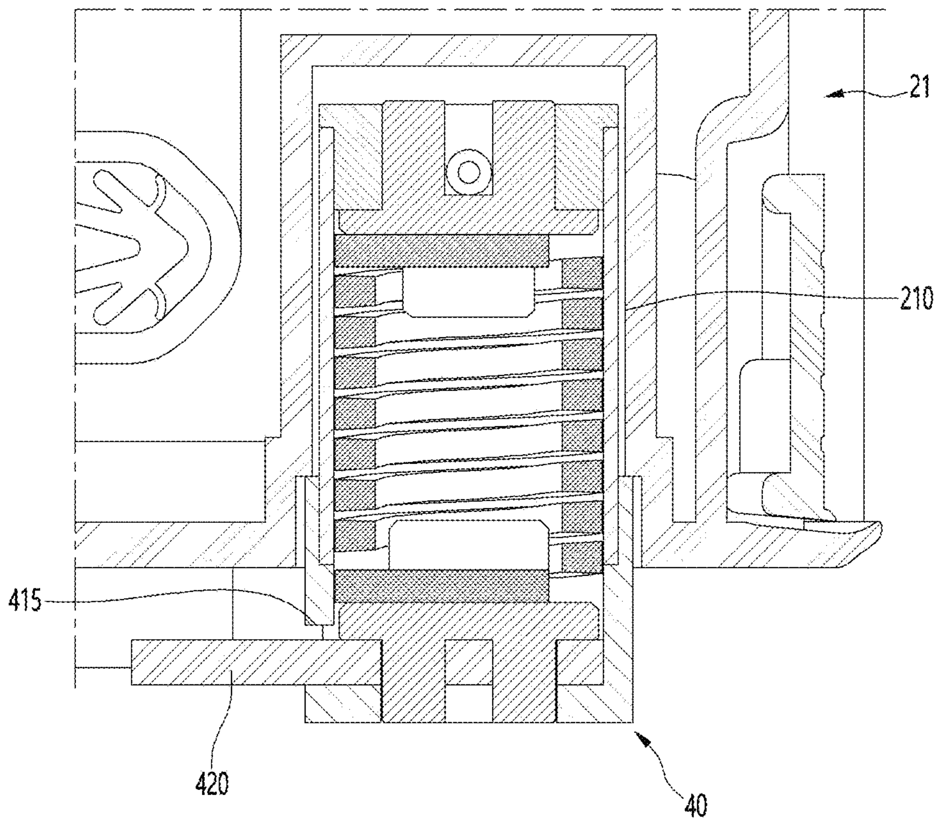
FIG. 13 is a cross-sectional view taken along line 13-13 of FIG. 12.

FIG. 13 is a cutaway cross-sectional view taken along line 13-13 of FIG. 12.

Referring to FIG. 13, in this embodiment, the second body 417 and the coupling extension portion 413 may be accommodated in the accommodation portion 210 disposed on the bottom surface of the first door 21.

In this state, a portion of the first body 410 disposed at the lower portion of the coupling extension portion 413 protrudes downward from the first door 21. Since the slot 415 is disposed at a downwardly protruding portion of the first door 21 in the first body 411, the lever 420 may rotate without interfering with the first door 21.

The first door 21 may include a lower frame, and the lower frame may define the accommodation portion 210.

Figure 14:
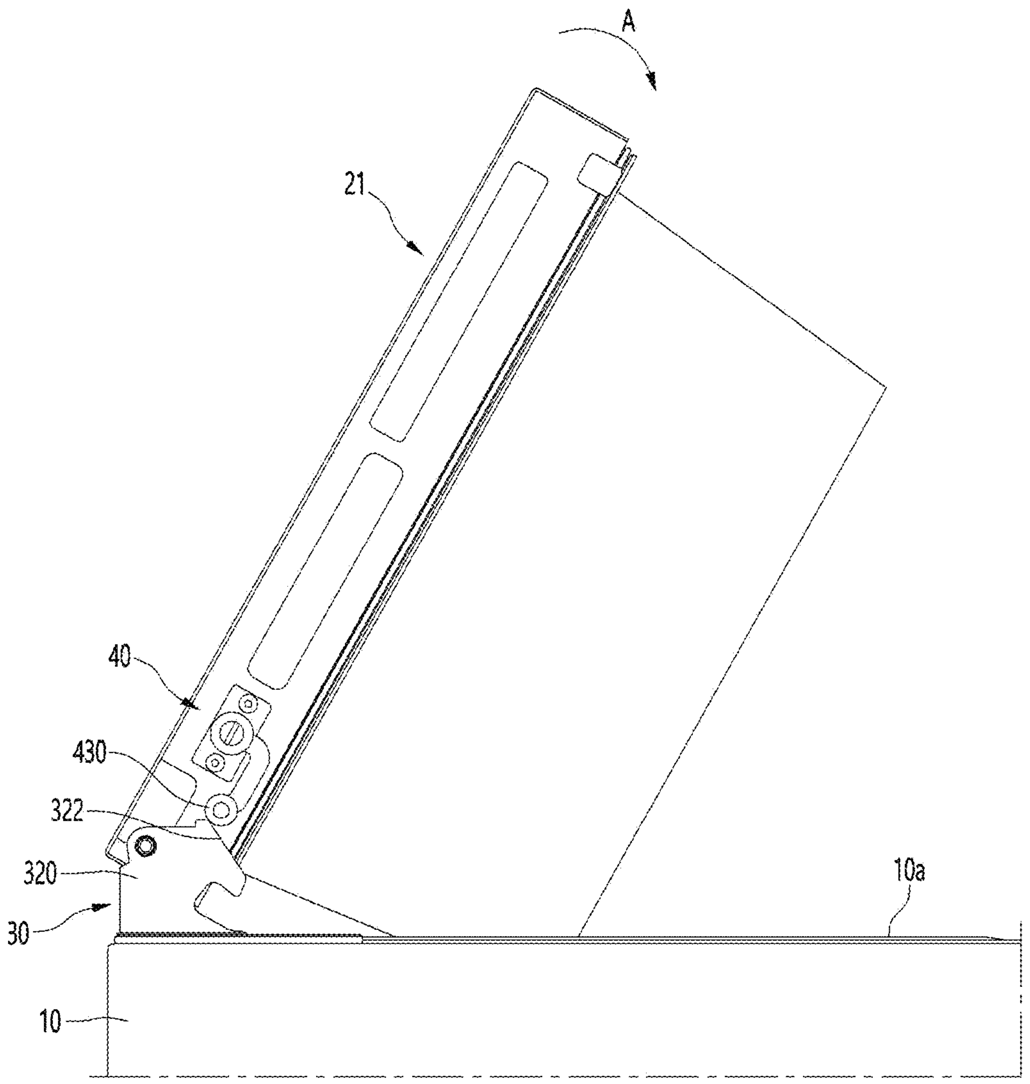
FIG. 14 is a view illustrating a state in which contact of the lever with a first surface of the bracket body in the process of closing a first door starts.
Figure 15:
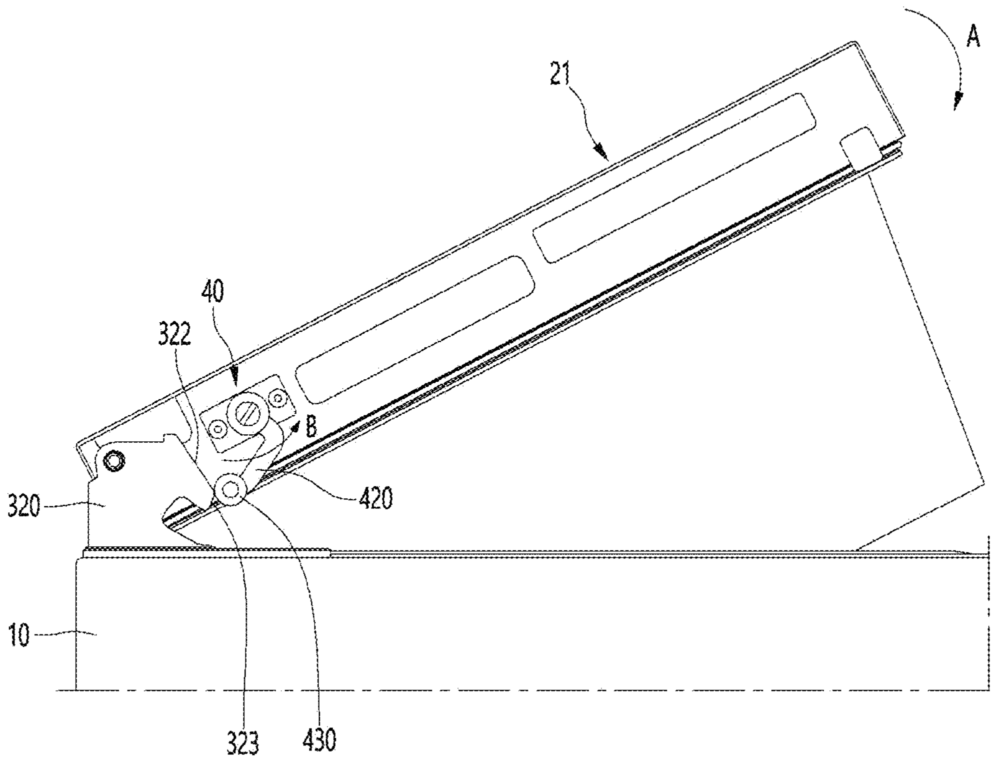
FIG. 15 is a view illustrating a state in which the lever rotates in one direction while moving along the first surface in the process of closing the first door.
Figure 16:
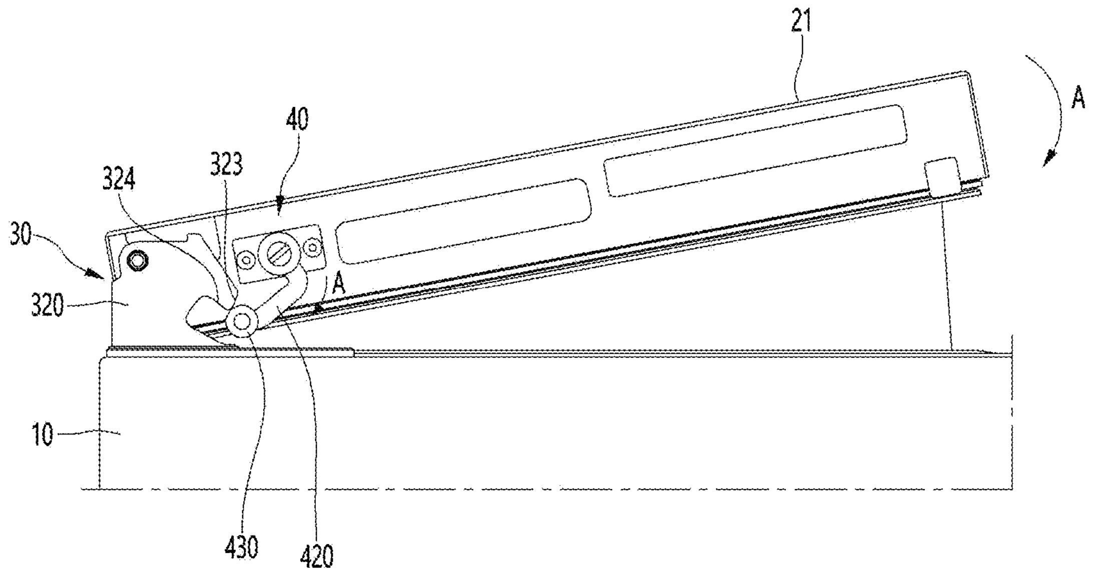
FIG. 16 is a view illustrating a state in which the lever rotates in the other direction while moving along a second surface in the process of closing the first door.
Figure 17:
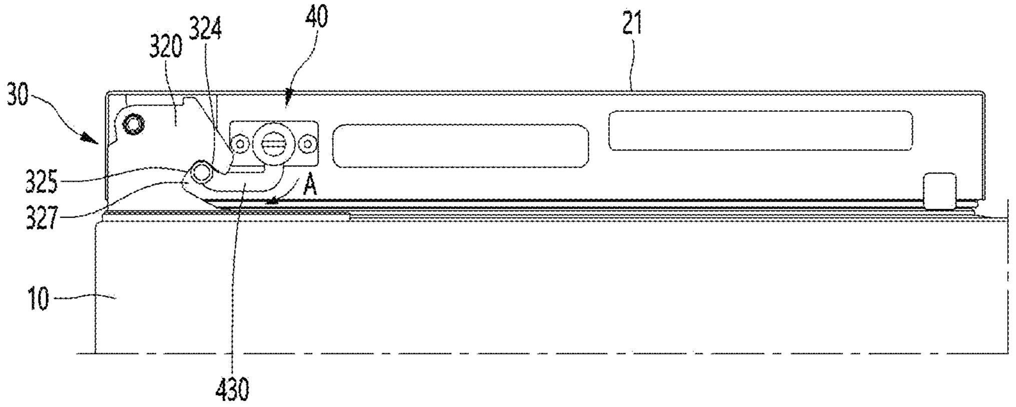
FIG. 17 is a view illustrating a position of the lever in the state in which the first door is closed.

FIG. 14 is a view illustrating a state in which contact of the lever with the first surface of the bracket body in the process of closing the first door starts, and FIG. 15 is a view illustrating a state in which the lever rotates in one direction while moving along the first surface in the process of closing the first door. FIG. 16 is a view illustrating a state in which the lever rotates in the other direction while moving along a second surface in the process of closing the first door, and FIG. 17 is a view illustrating a position of the lever in the state in which the first door is closed.

Referring to FIGS. 14 to 17, when the lever 420 is spaced apart from the bracket body 320 in the process of closing the first door 21 after the first door 21 is opened, external force may not act on the lever 420.

In the process of closing the first door 21 in a direction A, when the first door 21 is angled at an angle of about 60 degrees with respect to the front surface 10*a* of the cabinet 10, the lever 420 may be in contact with the first surface 322 of the bracket body 320.

When the first door 21 further rotates in the A direction while the lever 420 is in contact with the first surface 322 of the bracket body 320, the lever 420 may rotate in a direction B opposite to the direction A by an inclination of the first surface 322.

The first surface 322 applies resistive force to the lever 420 so that the lever 420 rotates in the direction B.

When the lever 420 is rotated in the direction B, the first extension portion 454 of the elastic member 450 also rotates in the direction B so that the elastic member 450 accumulates elastic force.

When the lever 420 approaches the second surface 323 while the second door 21 is closing, the elastic force accumulated in the elastic member 450 increases.

When the lever 420 is in contact with the second surface 323 while the first door 21 is closing, the lever 420 rotates in the direction A. When the lever 420 rotates in the A direction, the elastic force accumulated in the elastic member 450 decreases.

Here, since a length of the second surface 323 is shorter than a length of the first surface 322, the angle at which the lever 420 rotates in the direction B in contact with the second surface 323 is less than a rotation angle in the direction A.

In the state in which the lever 420 is in contact with the second surface 323, the lever 420 may inertially rotate in the direction A, and the rotation angle of the lever 420 in the direction A is small, a torque loss of the lever 420 may be reduced, or a reduction width of the elastic force accumulated in the elastic member 450 may be minimized.

According to this embodiment, the elastic force accumulated in the elastic member 450 is maximized in the state in which the lever 420 is in contact with the first surface 322. The elastic force accumulated in the elastic member 450 in the state in which the lever 420 is in contact with the second surface 323 is less than that accumulated in the elastic member 450 in the state in which the lever 420 is in contact with the first surface 322.

Alternatively, when an inclination angle of the second surface 323 is changed, the lever 420 may additionally rotate in the direction B while the lever 420 is in contact with the second surface 323. When the lever 420 additionally rotates in the direction B while moving along the second surface 323, elastic force accumulated in the elastic member 450 may be maximized in the state in which the lever 420 is in contact with the second surface 323.

When the lever 420 deviates from the second surface 323 in the process of closing the first door 21, the resistive force applied to the lever 420 is removed, and the elastic force accumulated in the elastic member 450 may act on the lever 420 to increase in rotation angle in the direction A of the lever 420, and thus, the first door 21 may be automatically closed. That is, while the lever 420 moves along the third surface 324, the elastic force accumulated in the elastic member 450 decreases. That is, the elastic force decreases as it acts as the closing force of the first door 21.

Here, since the lever 420 rotates while the roller 430 of the lever 420 is being accommodated in the accommodation groove 327, the elastic force of the elastic member 450 acts in a direction crossing the third surface 324 or in a normal direction in the state in which the roller 430 is in contact with the third surface 324. Therefore, the elastic force may be prevented from being concentrated at a specific point of the third surface 324, and efficiency of transmitting the elastic force to the third surface 324 is high.

As described above, when the elastic force of the elastic member 450 acts in a direction crossing the third surface 324, rattling of the first door 21 or a phenomenon in which the first door 21 is closed and then opened again due to the excessive action of the elastic force at a time point at which the first door 21 is closed may be prevented from occurring.

In this embodiment, as illustrated in FIG. 17, the roller 430 of the lever 420 is in contact with the third surface 324 and the fourth surface 325 when the door is closed.

The third surface 324 and the fourth surface 325 may provide the resistive force to the lever 420, and thus, the lever 420 exists in a substantially rotating state at a predetermined angle in the state in which the first door 21 is closed so that the elastic member 450 is maintained in the state of accumulating a certain amount of elastic force. Therefore, since the elastic member 450 applies force in the direction in which the first door 21 is closed in the state in which the first door 21 is closed, the closed state of the first door 21 may be stably maintained.

In the state in which the first door 21 is closed, and the lever 420 is in contact with the third surface 324, the elastic force accumulated in the elastic member 450 may be equal to or greater than the elastic force accumulated in the elastic member 450 in a state in which the first door 21 is opened at a predetermined angle, and the lever 420 is spaced apart from the first surface 322.

In summary, when the first door 21 is closed, while the lever 420 moves along a partial section of the contact surface 321, the elastic force is accumulated in the elastic member 450 and is maximized, and the elastic force of the elastic member 450 acts on the lever 420 in a different section of the contact surface so that the first door 21 is automatically closed.

In addition, while the lever 420 moves along a portion of the contact surface 321 based on the rear surface 21*b* of the first door 21, the roller 430 gets closer to the rear surface 21*b*, and while the lever 420 moves along the other portion of the contact surface 321, the contact surface 321 of the bracket body 320 is defined so that the roller 430 is away from the rear surface 21*b*.

In addition, while the lever 420 moves along a portion of the contact surface 321 based on the front surface 10*a* of the cabinet 10, the roller 430 gets closer to the front surface 10*a* of the cabinet 10, and while the lever 321 moves along the other portion of the contact surface 321, the contact surface 321 of the bracket body 320 is defined so that the roller 430 is away from the front surface 10*a* of the cabinet 10.

A case in which the first door 21 is opened will be briefly described.

When the first door 21 is initially opened in the closed state, the lever 420 moves along the third surface 324. While the lever 420 moves along the third surface 324, the elastic force accumulated in the elastic member 450 increases.

When the opening angle of the first door 21 increases, the lever 420 moves from the third surface 324 to the second surface 323 and then moves along the second surface 323.

While the lever 420 moves along the second surface 323, the elastic force accumulated in the elastic member 450 decreases slightly. Alternatively, while the lever 420 moves along the second surface 323, the elastic force accumulated in the elastic member 450 may increase.

When the opening angle of the first door 21 further increases, the lever 420 moves from the second surface 323 to the first surface 322 and then moves along the first surface 322. While the lever 420 moves along the first surface 322, the elastic force accumulated in the elastic member 450 decreases. When the lever 420 is spaced apart from the first surface 322, the elastic force accumulated in the elastic member 450 is minimized.

The invention claimed is:

1. A refrigerator comprising:
- a cabinet having a storage space;
- a hinge bracket coupled to the cabinet;
- a door to open and close the storage space and rotatably coupled to a shaft provided at the hinge bracket; and
- an auto closing device installed on the door at a position spaced apart from a rotational center line of the door and to interact with the hinge bracket,
- wherein the auto closing device comprises:
  - a lever to rotate on a rotational center line spaced apart from the rotational center line of the door;
  - an elastic member connected to the lever and disposed at a position spaced apart from the rotational center line of the door; and
  - a body installed on the door to rotatably support the lever.

2. The refrigerator of claim 1, wherein the rotational center line of the lever extends in a vertical direction.

3. The refrigerator of claim 1, wherein a portion of the lever is accommodated at the body and connected to the elastic member, and
- an other portion of the lever extends to an outside of the body to contact with a contact surface of the hinge bracket.

4. The refrigerator of claim 1, wherein the lever is bent once or more times, and a roller is rotatably connected to an end portion of the lever.

5. The refrigerator of claim 1, wherein the auto closing device further comprises a connector to connect the elastic member to the lever at the body.

6. The refrigerator of claim 5, wherein the lever comprises:
- a first part connected to the connector at the body;
- a second part extending from the first part; and
- a third part extending from the second part and to which a roller is coupled.

7. The refrigerator of claim 6, wherein the second part is bent once or more times in a horizontal direction and has a height that varies in a longitudinal direction.

8. The refrigerator of claim 7, wherein the third part is disposed higher than the first part, and
- the roller is coupled to a lower side of the third part.

9. The refrigerator of claim 8, wherein a portion of the body is accommodated in an accommodation portion provided at a lower side of the door, and an other portion of the body protrudes downward from the door, and
- the lever is rotatably connected to the other portion of the body, which protrudes downward from the door.

10. The refrigerator of claim 5, wherein the connector comprises:
- a lever coupling portion coupled to the lever;
- an elastic member coupling portion coupled to the elastic member; and
- a partition plate provided between the lever coupling portion and the elastic member.

11. The refrigerator of claim 10, wherein the lever coupling portion is coupled to the lever by passing through the lever from an upper side of the lever,
- the partition plate is seated on the lever, and
- the elastic member coupling portion is disposed above the partition plate.

12. The refrigerator of claim 11, wherein the elastic member comprises:
- a body portion provided by winding a wire several times; and
- an extension portion extending in a horizontal direction from a lower side of the body portion,
- wherein the extension portion is coupled to the elastic member coupling portion.

13. The refrigerator of claim 1, wherein the auto closing device further comprises a connector which is fixed at the body and to which the elastic member is connected.

14. The refrigerator of claim 1, wherein the elastic member comprises a torsion spring.

15. The refrigerator of claim 1, wherein, in a state in which the door is closed, the rotational center line of the lever is disposed closer to the front surface of the cabinet than the rotational center line of the door.

16. The refrigerator of claim 1, wherein the hinge bracket comprises a contact surface to contact with the lever in a process of opening the door, and in a state in which the door is closed, the body is disposed closer to a front surface of the door than a rear surface of the door, and a portion of the lever, which is in contact with the contact surface, is disposed closer to the rear surface of the door than a rotational center line of the lever.

17. The refrigerator of claim 1, wherein the hinge bracket comprises:

a coupling portion fixed to the cabinet; and a bracket body extending from the coupling portion and provided with a contact surface to contact with the lever, wherein, in the process of closing the door, elastic force is accumulated in the elastic member while the lever moves along a partial section of the contact surface, and in an other section of the contact surface, the elastic force of the elastic member acts on the lever so that the door is automatically closed.

18. A refrigerator comprising:

a cabinet having a storage space;

a hinge bracket coupled to the cabinet;

a door to open and close the storage space and rotatably coupled to a shaft provided at the hinge bracket; and an auto closing device installed on the door at a position spaced apart from a rotational center line of the door and to interact with the hinge bracket, wherein the auto closing device comprises:

a lever to rotate on a rotational center line spaced apart from the rotational center line of the door; and a torsion spring connected to the lever and disposed at a position spaced apart from a rotational center line of the door.

19. A refrigerator comprising:

a cabinet having a storage space;

a hinge bracket coupled to the cabinet;

a door to open and close the storage space and rotatably coupled to a shaft provided at the hinge bracket; and an auto closing device installed on the door at a position spaced apart from a rotational center line of the door and to interact with the hinge bracket, wherein the auto closing device comprises:

a lever to rotate on a rotational center line spaced apart from a rotational center line of the door; and an elastic member connected to the lever and disposed at a position spaced apart from a rotational center line of the door, wherein, in a state in which the door is closed, the rotational center line of the door is disposed closer to a front surface of the door than a rear surface of the door, and the rotational center line of the lever is disposed closer to the rear surface of the door than the rotational center line of the door.

20. The refrigerator of claim 19, wherein the hinge bracket comprises a contact surface to contact with the lever, and in the state in which the door is closed, a portion of the contact surface, which is in contact with the lever, is disposed closer to the rear surface of the door than the rotational center line of the lever.

* * * * *